Patented Sept. 11, 1951

2,567,572

UNITED STATES PATENT OFFICE 2,567,572

SYNTHESIS OF VITAMIN A

Nicholas A. Milas, Belmont, Mass., assignor to Research Corporation, New York, N. Y., a corporation of New York No Drawing. Application November 28, 1947, Serial No. 788,683

6 Claims. (Cl. 260—617)

In my Patents Nos. 2,369,156, 2,369,160, and others of the series 2,369,156–2,369,168 I have shown the synthesis of the compound referred to therein as compound XIV and having the formula

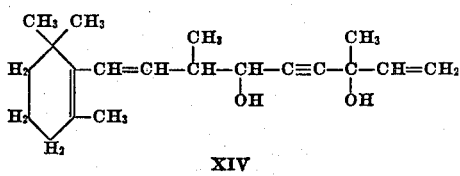

XIV by allowing the aldehyde compound

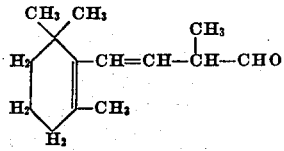

IV to react with the Grignard compound

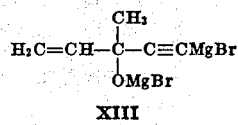

XIII

Compound XIV was selectively hydrogenated to convert the acetylene bond thereof into an olefin bond and the resulting glycol compound

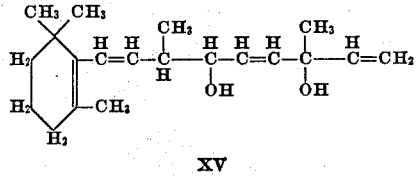

XV was rearranged and dehydrated to the compound

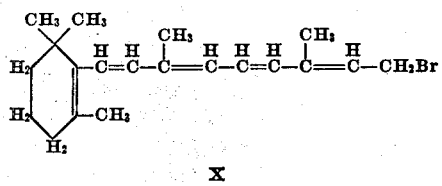

X by successive treatments with a phosphorus halide in the presence of pyridine and with potassium hydroxide in alcohol. Compound X was then converted to vitamin A by any one of several procedures disclosed in said patents.

The present invention relates to a direct process for the production of compound X. In accordance with the present invention the acetylene carbinol of compound XIII, i. e. the compound

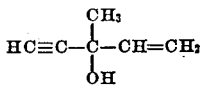

XII which may be obtained as described in said patents is first rearranged by treating it in an aqueous solution of a mineral acid such as sulfuric acid to form the enyne carbinol compound XIIa as follows:

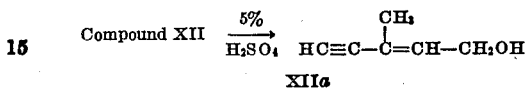

XIIa

The Grignard of compound XIIa is then reacted with the aldehyde compound IV (which may be made by application of the Darzens synthesis to β-ionone) as follows:

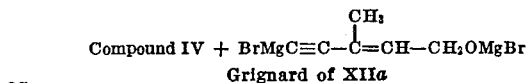

Grignard of XIIa

Hydrolysis with
———→
NH₄Cl or tartaric acid

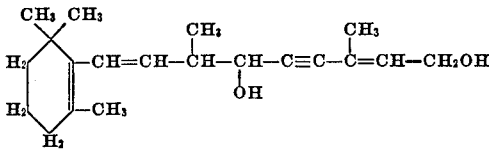

XIVa and the resulting compound XIVa is partially hydrogenated with Pd on CaCO₃ to convert the acetylene bond thereof into an olefine bond and produce the following compound

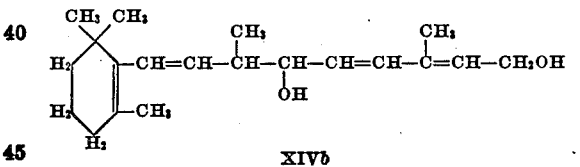

XIVb

Compound XIVb is then treated with pyridine hydrobromide in pyridine to form vitamin A directly or vitamin A is formed from compound XIVb by following any of the other methods of dehydration described in the above-mentioned patents.

The invention is illustrated by the following specific examples:

Rearrangement of compound XII to compound

*XIIa.*—A mixture of 20 g. of compound XII and 200 cc. of 5% sulfuric acid was shaken in nitrogen for 20 hours. At the end of this time a bluish layer separated above the aqueous layer and had a distinct odor of a vinyl acetylene. The entire mixture was neutralized with sodium bicarbonate and extracted with ethyl ether, the extract dried with anhydrous magnesium sulfate and filtered. After removal of the ether the residual liquid was fractionated under a reduced pressure and the fraction boiling at 65–66° (10 mm.) collected and analyzed; $n_D^{25}$, 1.4782; $d_4^{26}$, 0.8577; calcd. $M_R$, 28.97; found $M_R$, 31.69, showing an exaltation of 2.72. This exaltation is due to the conjugation of the olefin with the acetylene bond. The unrearranged product had a normal $M_R$ of 28.79. The rearranged product has also a Zerewitinoff value of 1.97, as against the calculated value of 2.00.

*Preparation of compound XIVa from compounds IV and XIIa.*—A Grignard was prepared in the usual manner in about 150 cc. of anhydrous ethyl ether from 7.2 g. of ethyl bromide and 1.6 g. (10% excess) of magnesium. The mixture was cooled to 0° and to it was added in an atmosphere of nitrogen 3.1 g. of the vinyl acetylene carbinol in an equal volume of anhydrous ether. In order to effect the complete formation of the Grignard of compound XIIa, the mixture was allowed to stir in nitrogen overnight, then refluxed gently for two hours. It was then cooled to 0° and to it was added 6 g. of the aldehyde IV in an equal volume of anhydrous ether. The mixture was then allowed to stir overnight at room temperature, then hydrolyzed with excess aqueous tartaric acid solution. The ethereal solution was separated, washed with water and dried over anhydrous magnesium sulfate. When the mixture was filtered and the ether removed under a reduced pressure, a yellowish highly viscous liquid (about 7 g.) remained. To remove volatile materials, this liquid was subjected to a vacuum of $10^{-4}$ mm. at a temperature of 100° for one hour. It was then analyzed and found to have the expected hydrogenation and Zerewitinoff values for compound XIVa. Attempts to crystallize it were not successful.

The successive hydrogenation and dehydration of compound XIVa, formed as described above, to the production of compounds XIVb and vitamin A need not be described in detail because methods for the carrying out of these steps on similar compounds are amply disclosed in said patents.

I claim:

1. Process which comprises reacting a compound of the formula

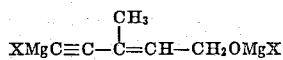

wherein X stands for halogen with a compound of the formula

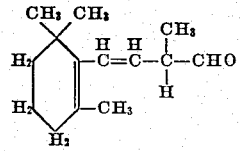

obtainable by application of the Darzens synthesis to β-ionone.

2. Process as defined in claim 1 in which the reaction product is hydrolyzed to the formation of the compound of the formula

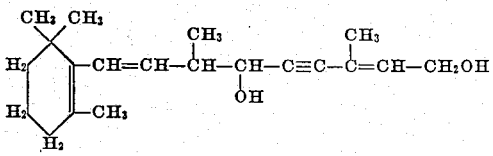

3. Process as defined in claim 2 in which the hydrolysis product is hydrogenated to convert the acetylene bond into the olefine bond.

4. Process as defined in claim 3 in which the resulting olefinic compound is converted into vitamin A.

5. As a new product the compound of the formula

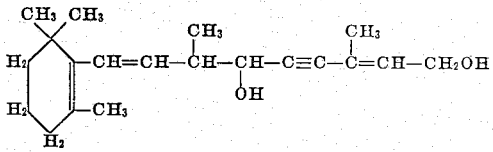

6. As a new product the compound of the formula

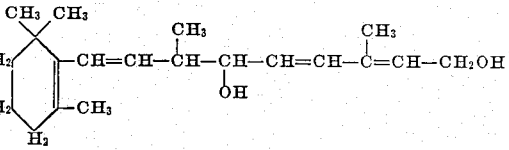

NICHOLAS A. MILAS.

REFERENCES CITED

The following references are of record in the file of this patent:

UNITED STATES PATENTS

| Number | Name | Date |
| --- | --- | --- |
| 2,369,161 | Milas | Feb. 13, 1945 |
| 2,451,739 | Isler | Oct. 19, 1948 |

OTHER REFERENCES

Cymerman et al.: Jour. Chem. Soc. (1945), pages 90–94.

Isler et al.: Helv. Chim. Acta, vol. 30, 1911–27 (1947).

Isler et al.: Barell Festschrift (1946), 33–44.